(12) United States Patent
Hayashide (10) Patent No.: US 8,885,220 B2
(45) Date of Patent: Nov. 11, 2014

(54) METHOD OF DETECTING FLOATING AMOUNT OF ORIGINAL FOR IMAGE READING APPARATUS, METHOD OF IMAGE PROCESSING USING THE SAME, AND IMAGE READING APPARATUS

(71) Applicant: Canon Kabushiki Kaisha, Tokyo (JP)

(72) Inventor: Tadao Hayashide, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 42 days.

(21) Appl. No.: 13/675,148

(22) Filed: Nov. 13, 2012

(65) Prior Publication Data

US 2013/0163054 A1   Jun. 27, 2013

(30) Foreign Application Priority Data

Dec. 26, 2011 (JP) ................. 2011-282612

(51) Int. Cl.
*H04N 1/40* (2006.01)
*H04N 1/193* (2006.01)
*H04N 1/00* (2006.01)
*H04N 1/409* (2006.01)
*H04N 1/10* (2006.01)

(52) U.S. Cl.
CPC ............. *H04N 1/409* (2013.01); *H04N 1/193* (2013.01); *H04N 1/00076* (2013.01); *H04N 1/00013* (2013.01); *H04N 2201/0081* (2013.01); *H04N 1/0005* (2013.01); *H04N 1/00082* (2013.01); *H04N 1/00031* (2013.01); *H04N 1/00068* (2013.01); *H04N 1/1017* (2013.01); *H04N 1/00063* (2013.01)
USPC .......................................... 358/2.1; 358/3.15

(58) Field of Classification Search
USPC .......... 358/1.9, 2.1, 3.15, 3.27; 348/345, 349; 382/266, 103, 190, 199; 359/626
See application file for complete search history.

(56) References Cited

U.S. PATENT DOCUMENTS 5,446,276 A * 8/1995 Iyoda et al. ................ 250/208.1
6,747,813 B2 * 6/2004 Wakai et al. ................ 359/726

FOREIGN PATENT DOCUMENTS

| EP | 1967880 A1 * | 9/2008 |
| JP | 61133779 A * | 6/1986 |
| JP | 11215329 A | 8/1998 |
| JP | 2009246623 A | 10/2009 |

* cited by examiner

*Primary Examiner* — Thomas D Lee
*Assistant Examiner* — Stephen M Brinich
(74) *Attorney, Agent, or Firm* — Rossi, Kimms & McDowell LLP (57) ABSTRACT

A method detects the floating amount of an original from an original table based on image information read by an image reading apparatus having the original table on which the original is placed, a line sensor, and a lens array arranged in a direction of arrangement of pixels of the line sensor. The method includes obtaining image information of the original as line image information by performing scanning in the direction of arrangement of pixels of the line sensor, extracting a distinguishing portion from the line image information, detecting a characteristic frequency by frequency analysis of image information of the distinguishing portion, and determining the floating amount of the original from the characteristic frequency.

16 Claims, 8 Drawing Sheets

METHOD OF DETECTING FLOATING AMOUNT OF ORIGINAL FOR IMAGE READING APPARATUS, METHOD OF IMAGE PROCESSING USING THE SAME, AND IMAGE READING APPARATUS

BACKGROUND OF THE INVENTION

1. Field of the Invention

The present invention relates to a method of detecting the floating amount of an original for an image reading apparatus, a method of image processing using the same, and an image reading apparatus, in particular to a method of detecting the floating amount of an original placed on an original table of an image reading apparatus having a CIS optical system from read image information and an image reading apparatus using the method.

2. Description of the Related Art

Two types of optical systems are mainly known as optical systems for use in image reading apparatuses. One of them is a "reduction optical system" in which a one-dimensional photoelectric transducer having a width smaller than the reading width and a reduction imaging lens are used in combination, and the other is a "contact 1× magnification optical system (commonly called a contact image sensor, which will be hereinafter referred to as CIS optical system)" in which a one-dimensional photoelectric transducer having a width substantially the same as the reading width and an erection 1× magnification lens array are used in combination.

Figure 11:
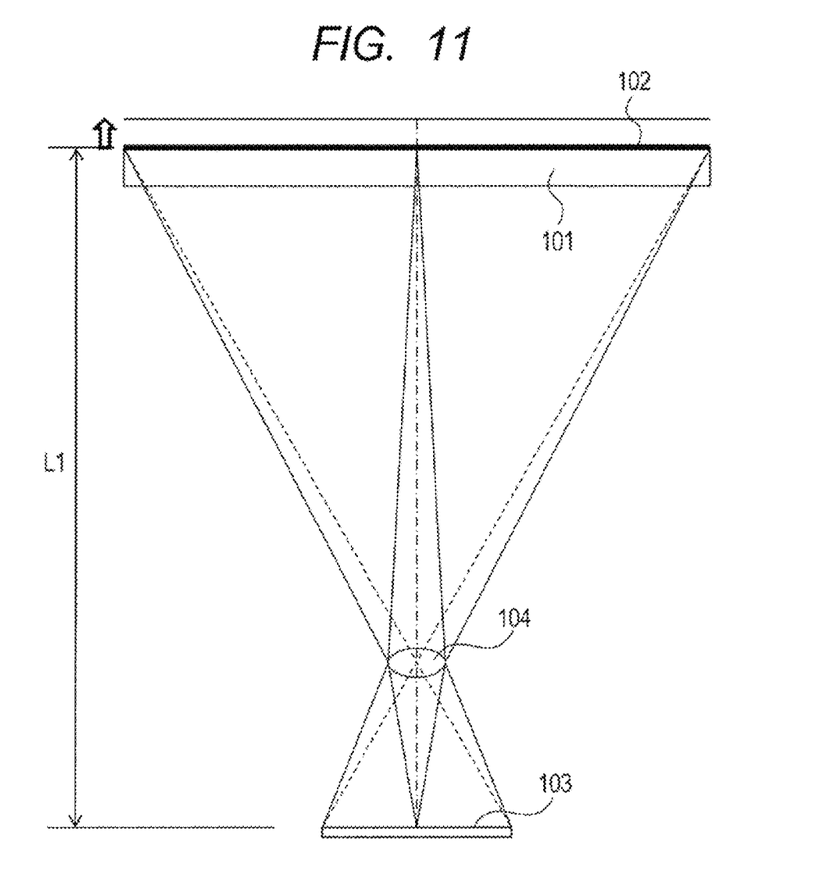
FIG. 11 is a diagram illustrating a conventional reduction optical system.

FIG. 11 illustrates the basic construction of the reduction optical system. The reduction optical system includes an original 102 placed on an original glass plate 101 and illuminated by a light source not shown in the drawing and a reduction imaging lens 104 that forms an image of the original 102 on a one-dimensional photoelectric transducer 103 such as a CCD. FIG. 11 also illustrates the optical path length L1 of this optical system.

Figure 12:
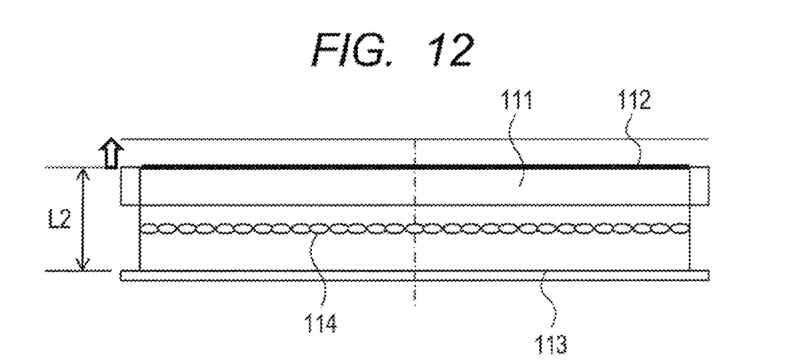
FIG. 12 is a diagram illustrating a conventional CIS optical system.

FIG. 12 illustrates the basic construction of the CIS optical system. The CIS optical system includes an erection 1× magnification lens array 114 that forms an image of an original 112 placed on an original glass plate 111 and illuminated by a light source not shown in the drawing on one-dimensional photoelectric transducer 113. FIG. 12 also illustrates the optical path length L2 of this optical system.

The optical path length of the reduction optical system tends to be longer than that of the CIS optical system because of constraints on the angle of field of the reduction imaging lens. Floating of the original 102, 112 from the original glass plate 101, 111 indicated by arrows in FIGS. 11 and 12 leads to a change in the imaging condition on the light receiving element. The change in the imaging condition is smaller in the reduction optical system than in the CIS optical system, because the reduction optical system has a large depth of focus.

On the other hand, in the CIS optical system, since constraints on the angle of field of the erection 1x magnification lens array 104 is small, the optical path length can be made very short, and the overall thickness and size of the unit can be made small. On the other hand, the depth of focus of the CIS optical system is small.

Figure 13:
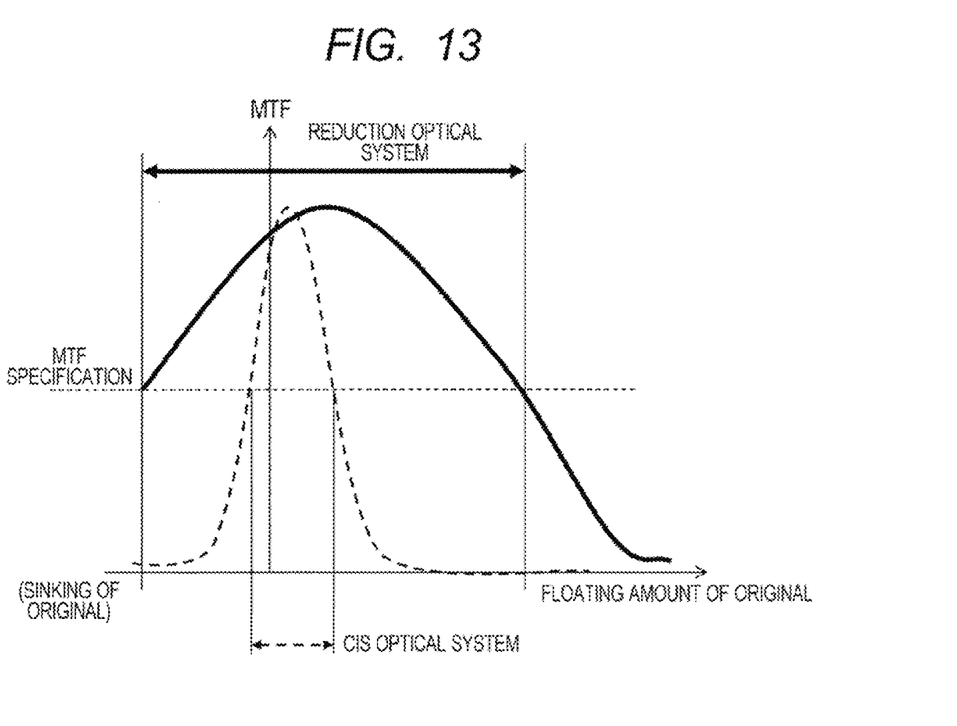
FIG. 13 is a diagram illustrating the depth of focus in a conventional reduction optical system and a conventional CIS optical system.

FIG. 13 shows comparison of the depth of focus between the reduction optical system and the CIS optical system. Since the reduction optical system has a large depth of focus, MTF is characteristically not so sensitive to the floating amount of the original as shown by the thick solid curve in FIG. 13. On the other hand, since the CIS optical system has a small depth of focus, MTF is sensitive to the floating amount of the original and liable to decrease as shown by the broken curve in FIG. 13.

Figure 14:
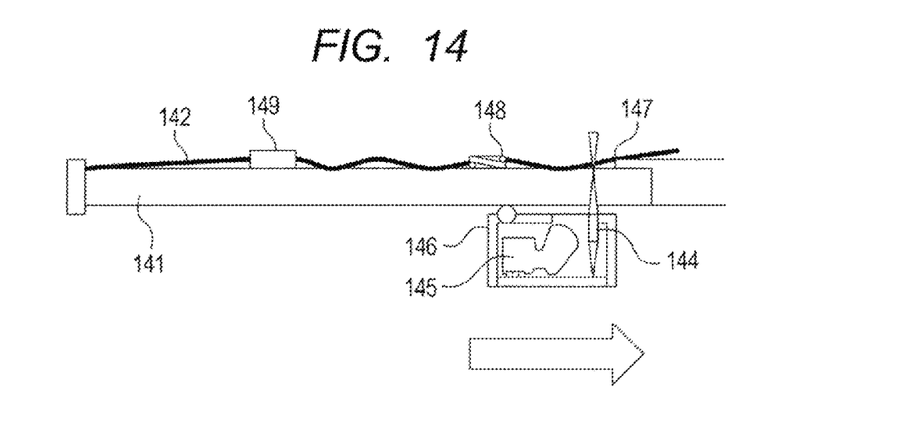
FIG. 14 is a diagram illustrating a cause of defocus in an image reading apparatus.

Originals read by the image reading apparatus are commonly flat paper sheets, and situations in which an original is floating when image reading is performed frequently occur in common usage of the image reading apparatus. A case where floating of an original is occurring is illustrated in FIG. 14.

The original 142 placed on the original glass plate 141 is illuminated by an illumination device 145 accommodated in a carriage 146. Light reflected by the original 142 is read by a line sensor through a CIS optical system 144. The carriage 146 is driven by a driving device (not shown) to shift in the direction indicated by an arrow (sub-scanning direction) to effect two-dimensional scanning, whereby an image information of the original is obtained. The image information thus obtained is transmitted to and processed by an image processing apparatus, which is not shown in the drawings.

The original 142 is placed in such a way as to abut an original abutting portion 147. However, the original 142 may sometimes override the original abutting portion as can be often the case if the size of the original 142 is larger than the original glass plate 141. In cases where a paper clip 148 or a binding clip 149 is attached to the original, floating of the original by an amount equal to or half the thickness of such a clip will occur. Furthermore, in cases where the original is a plurality of bundled sheets or where the original has a wrinkle resulting from a crease made in the past, floating of the original will occur.

Defocus resulting from floating of an original leads to an undesirable result of reading by the image reading apparatus. In cases where a read image including letter (or character) information is subjected to optical character recognition processing (Optical Character Reader, which will be hereinafter referred to as OCR processing), such defocus leads to, for example, an increase in the probability of erroneous reading. This is a considerable problem to be solved as a matter of information processing.

As a conventional image reading apparatus using a CIS optical system, for example, an apparatus disclosed in Japanese Patent Application Laid Open No. H11-215329 is known. This apparatus is configured to estimate the floating amount of original from a read output value in a predetermined white background area during scanning of the surface of an original and to adjust an image correction coefficient.

As an image reading apparatus using neither a reduction optical system nor CIS optical system, an image reading apparatus disclosed in Japanese Patent Application Laid-Open No. 2009-246623 is known. This apparatus is intended to solve the two problems. This apparatus has two rows of optical systems arranged in a staggered manner in the main scanning direction. The relative reading optical axes of the two rows are incline in the sub-scanning direction to detect the floating amount of an original.

In the prior art disclosed in Japanese Patent Application Laid Open No. H11-215329, the reading output value in the white background changes depending on the manufacturing variation and/or stability of the illumination device. Furthermore, smudges in the white background can lead to erroneous processing. This prior art method cannot be applied, by its nature, to images having no white background, and therefore cannot be used when reading an image printed over the entire area of the sheet. The prior art disclosed in Japanese Patent Application Laid-Open No. 2009-246623 requires, as will be easily supposed, a considerably increased number of constituent parts in the optical system and needs longer time for adjustment and other operations than before due to the complexity of the apparatus.

SUMMARY OF THE INVENTION

An object of the present invention is to provide a method of detecting the floating amount of an original even without a white background, using an optical system having a simple construction.

To achieve the above object, there is provided according to the present invention a method of detecting floating amount of original from an original table based on image information read by an image reading apparatus having the original table on which an original is placed, a line sensor, and a lens array arranged in a direction of arrangement of pixels of the line sensor, the method comprising: obtaining image information of the original as line image information by performing scanning in the direction of arrangement of the line sensor; extracting a distinguishing portion from the line image information, detecting a characteristic frequency by frequency analysis of image information of the distinguishing portion; and determining the floating amount of the original from the characteristic frequency.

The present invention can provide a method of detecting the floating amount of original with which the floating amount of an original can be detected based on image information in a portion having high contrast such as portion containing a character or line or an edge portion of the original without requiring the original to have a white background, which is needed in prior arts, independently from manufacturing variations and stability of the illumination device, while using a conventional CIS optical system without any modification, and without using a new optical system.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the following, preferred embodiments of the method of detecting floating amount of original in an image reading apparatus according to the present invention will be described in detail with reference to the accompanying drawings.

Embodiment 1

Figure 1:
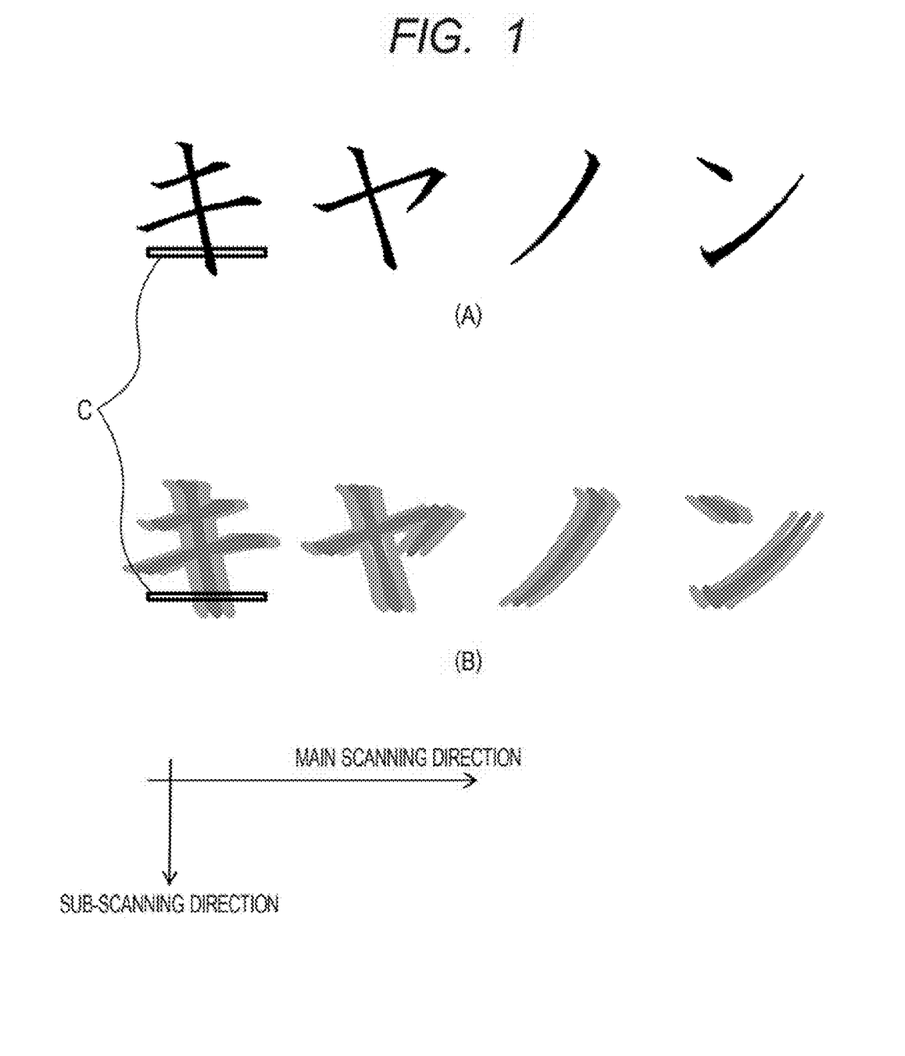
FIG. 1 shows images read by an image reading apparatus according to a first embodiment of the present invention.
Figure 2:
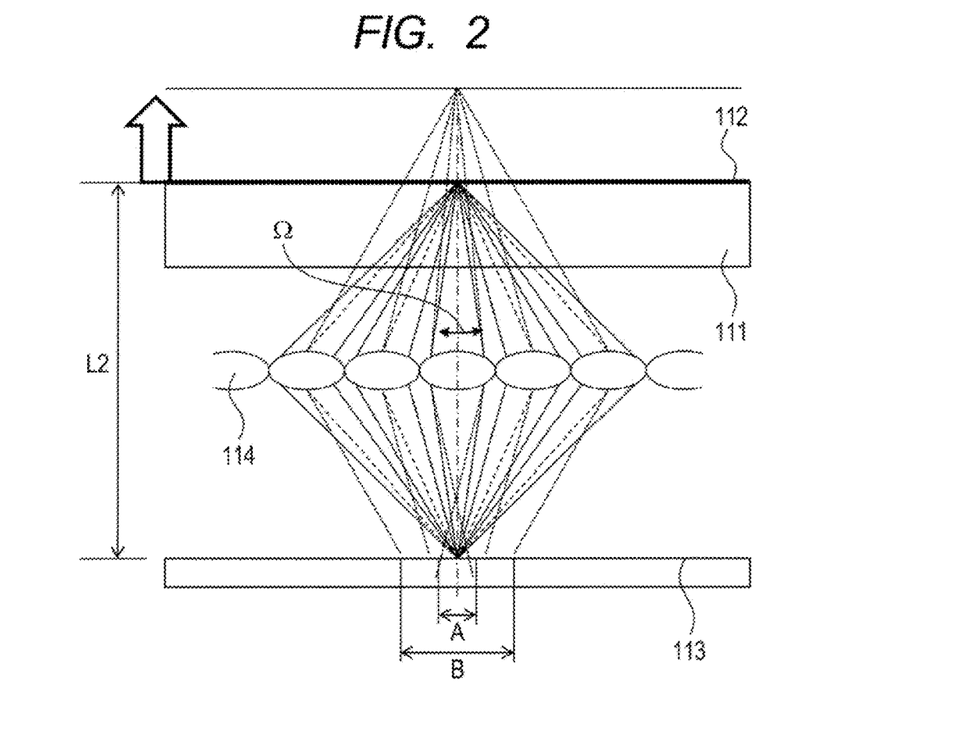
FIG. 2 is a diagram illustrating factors responsible for defocus in a conventional CIS optical system.

In the following an image analyzing method according to a first embodiment of the present invention will be described with reference to FIGS. 1 to 5. FIG. 1 shows an image read by a common image reading apparatus using a CIS optical system. The basic construction of the CIS optical system is shown in FIG. 2. The CIS optical system is composed of an erection 1× magnification lens array (lens array) 114 that forms an image of an original 112, which is placed on an original glass plate 111 and illuminated by a light source not shown in the drawings, on a one-dimensional photoelectric transducer (line sensor) 113 such as a CCD. FIG. 2 also shows the optical path length L2 of this optical system. The erection 1× magnification lens array (lens array) 114 has a plurality of lenses arranged along the direction of arrangement of the pixels of the one-dimensional photoelectric transducer (line sensor) 113.

(A) in FIG. 1 shows an image without defocus blur read on the surface of the original glass plate. (B) in FIG. 1 shows an image with defocus blur read in a state in which the original is floating off the surface of the original glass plate. As seen in (B) in FIG. 1, defocus blur generated in the CIS optical system is characterized by thickened letters and image multiplexing along the main scanning direction.

When information on an original placed on the original table is read with a CIS optical system, if the original is in a state floating off the surface of the glass plate of the original table, the imaging condition is extremely deteriorated as shown in (B) in FIG. 1. The following two factors are responsible for the deterioration. A first factor is that the angle of aperture Ω shown in FIG. 2 is large. Although the diameter of each lens in the erection 1× magnification lens array is small, it is difficult to make the diameter smaller than a certain diameter due to constraints in manufacturing. On the other hand, the optical path length L2 is designed to be short. Thus, a large angle of aperture Ω is necessitated. Hence, if floating of the original occurs, large blur is generated (as indicated by double-sided arrow A in FIG. 2). A second factor is that a point on the original is imaged by a plurality of lenses. Beams passing through the plurality of lenses have different angles of field for different lenses. In consequence, if floating of the original occurs, large blur is generated due to misalignment of overlapping images on the one-dimensional photoelectric transducer 113 (as indicated by double-sided arrow B in FIG. 2).

Blur caused by the second factor depends on the pitch of the erection 1× magnification lens array 114 and the angle of field to a large degree. Therefore, if blur caused by the second factor is quantified into a numerical value, a factor correlating with defocus can be obtained.

Figure 3:
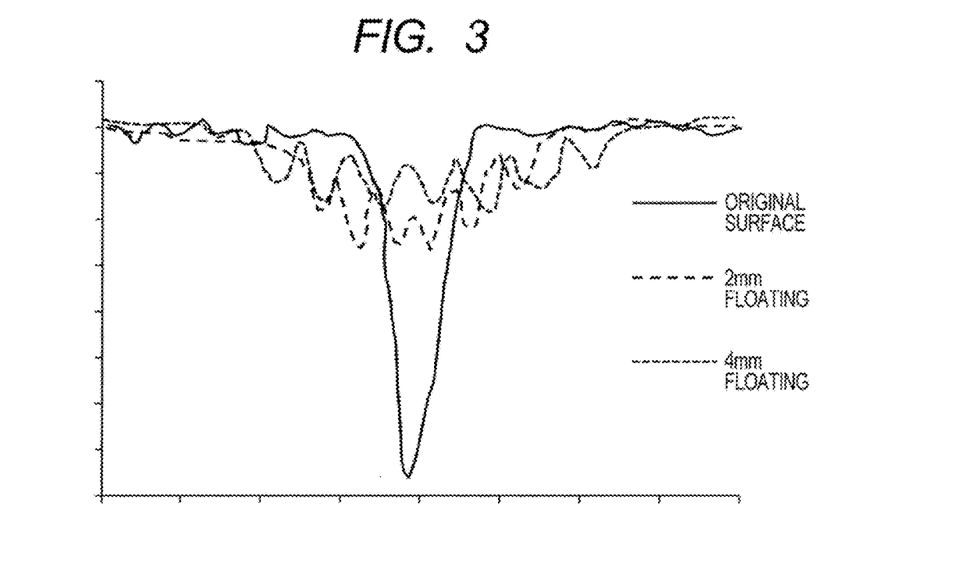
FIG. 3 is a graph showing an extracted signal for which frequency analysis is to be performed in the first embodiment of the present invention.

FIG. 3 is a graph showing the illuminance distribution with respect to the main scanning direction in area C in the read images shown in FIG. 1. When floating of the original occurs, the width of illuminance extends along the main scanning direction with decreasing amplitude of illuminance.

Figure 4:
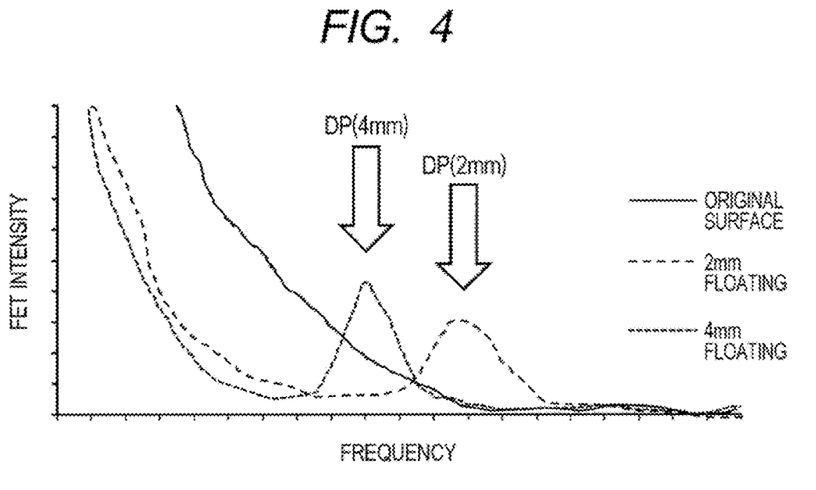
FIG. 4 is a graph showing a result of frequency analysis in the first embodiment of the present invention.

FIG. 4 shows a result of frequency analysis of the illuminance signal using fast Fourier transformation (FFT). Frequency analysis of the illuminance signal of an image reveals, in addition to frequency characteristics intrinsic to the original image information and frequency characteristics ascribed to the specific sensor pitch of the image reading apparatus and noises, a characteristic frequency (or defocus parameter, which will be hereinafter referred to as DP) ascribed to floating of the original in the CIS optical system appearing in a specific frequency range that is determined by specifications of the lens array. In the case shown in FIG. 4, DPs ascribed to floating of the original 2 mm above (2 mm Floating) and 4 mm above (4 mm Floating) the glass surface of the original table appear as conspicuous peaks as compared to the signal obtained on the original surface.

In this embodiment, processing of determining the frequency at which the FFT intensity is the highest, which indicated by arrow in FIG. 4, as DP is performed.

Figure 5:
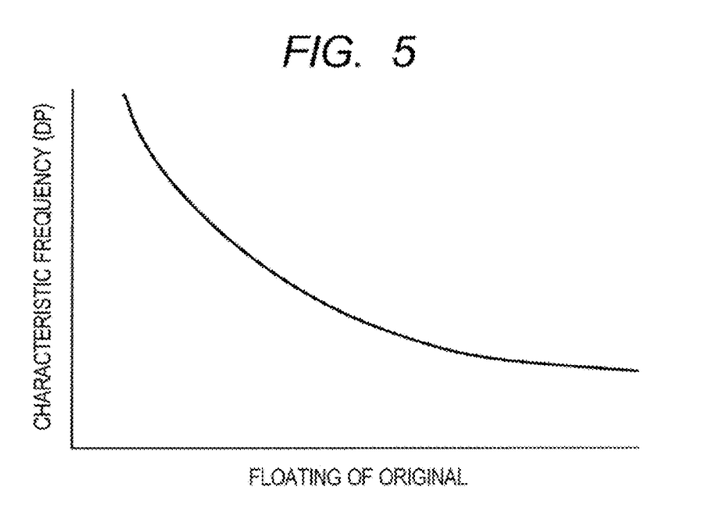
FIG. 5 is a graph showing the relationship between the floating amount of the original and the characteristic frequency (DP).

The values of DP and the floating amount of the original, which are both positive, are in a relationship represented by a curve asymptotic to the axis of "floating of original equal zero" and the axis of "characteristic frequency (DP) equal zero", as shown in FIG. 5. The DP becomes lower as the floating amount of the original increases. Based on this relationship between the floating amount of the original and the DP, the floating amount of the original can be determined by detecting the DP.

In this embodiment, the relationship represented by the aforementioned curve is stored in the apparatus as a function expression, and the floating amount of the original can be determined by substituting the detected value of the DP into the function expression.

Once the floating amount of the original is determined, how the imaging condition and the density become with this floating amount can easily be estimated using simulation or other methods. Therefore, appropriate image processing such as contrast correction and density correction can be applied to the image in accordance with the floating amount of the original.

The area C in the read image selected to extract the characteristic frequency (DP) is desirably an area having high contrast rather than a monotonous image area. In a monotonous image area, the result of frequency analysis may contain large noise components, disabling accurate detection of the DP in some cases.

The sequential processing for determining the floating amount of the original described above may be executed while reading process by the image reading apparatus is performed. The sequential processing for determining the floating amount of the original according to the first embodiment will be described with reference to the flow chart in FIG. 6.

Figure 6:
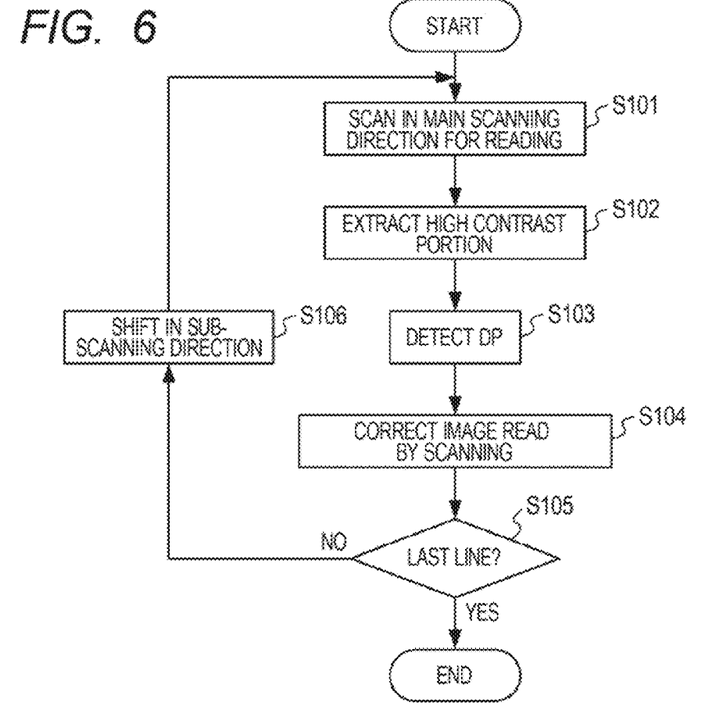
FIG. 6 is a flow chart of the operation of the image reading apparatus according to the first embodiment of the present invention.

The image reading apparatus starts to operate upon receiving a read command.

In step S101, scanning reading along the main scanning direction is performed to obtain image information with respect to the main scanning direction (line image information). The scanning reading along the main scanning direction reads image information along the direction of arrangement of the erection 1× magnification lens array 114 (main scanning direction). After the completion of scanning reading of one line along the main scanning direction, the process proceeds to step S102.

In step S102, a high contrast portion is extracted from the image information of one line (line image information) thus obtained. The high contrast portion serves as a distinguishing portion to be used in a later DP detection process. By using this distinguishing portion in the DP detection, DP extraction using frequency analysis executed later can be prevented from being affected by noises, which will matter if a monotonous image portion is selected.

Then, in step S103, a characteristic frequency (DP) is detected by performing frequency analysis of the image information of the high contrast portion extracted in step S102.

Then, in step S104, the image data of one line obtained by scanning reading is corrected based on the detected DP.

In step S105, a determination is made as to whether the main scanning line of which the scanning reading is performed is the last line or not. If it is not the last line, the process proceeds to step S106. If it is the last line, the process is terminated.

In step S106, the carriage on which the erection 1× magnification lens array 114 is fixedly mounted is shifted in the sub-scanning direction. Then, the process returns to step S101, and scanning reading is performed repeatedly for the next and subsequent lines up to the last line.

By the above processing, a two-dimensional image having high image quality with little influence by floating of the original can be obtained promptly after the completion of the scanning operation of the image reading apparatus.

Embodiment 2

In the following, a method of detecting the floating amount of original in the image reading apparatus according to a second embodiment of the present invention will be described with reference to FIGS. 7 to 10.

Figure 7:
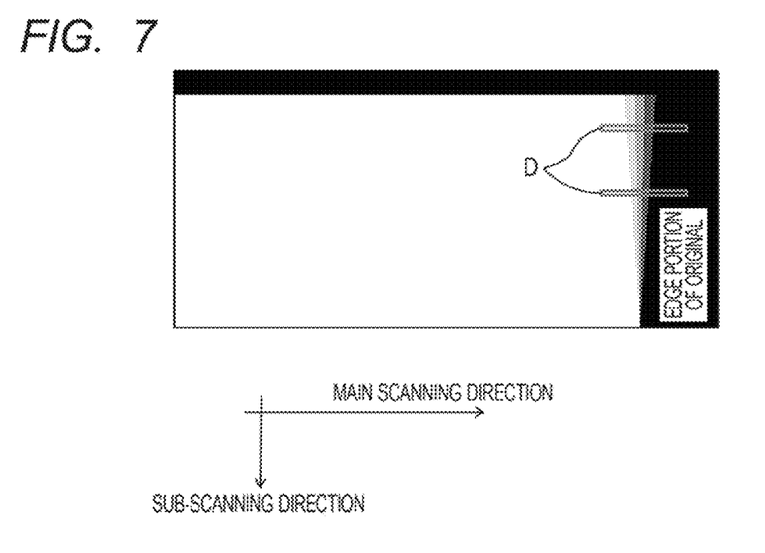
FIG. 7 shows an image read by an image reading apparatus according to a second embodiment of the present invention.

FIG. 7 shows an image read by a common image reading apparatus using a CIS optical system in a state in which an original is overriding an original abutting portion 147 shown in FIG. 14 to float. The floating amount of the original increases upwardly in FIG. 7, and accordingly an influence of defocus appears in the read image in the right edge portion of the original. In the following description, it is assumed that the floating amount of the original is constant along the horizontal direction in FIG. 7 (i.e. main scanning direction).

Figure 8:
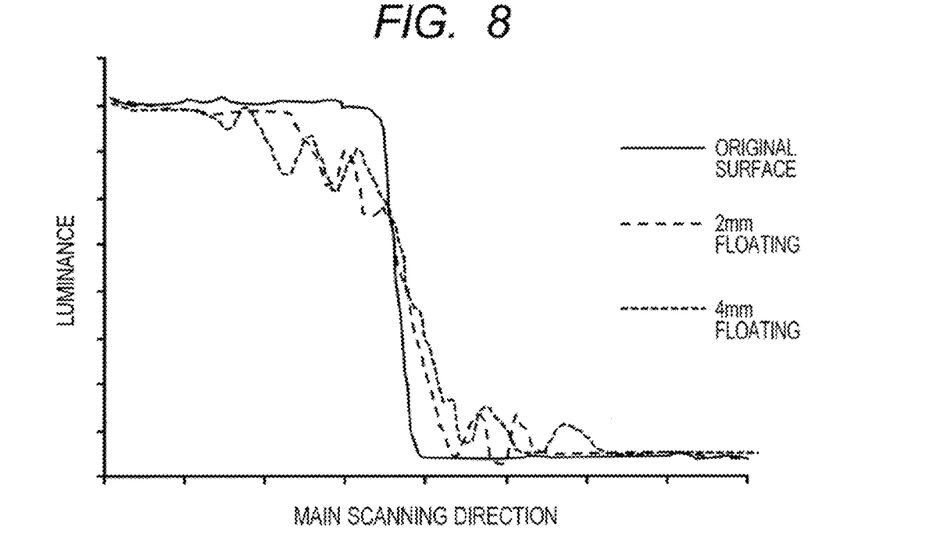
FIG. 8 is a graph showing an extracted signal for which frequency analysis is to be performed in the second embodiment of the present invention.
Figure 9:
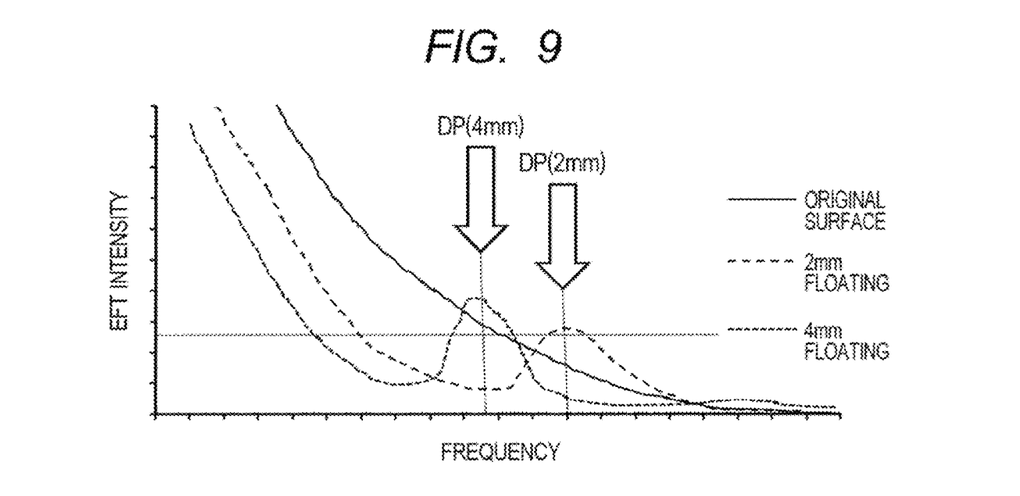
FIG. 9 is a graph showing a result of frequency analysis in the second embodiment of the present invention.

In this embodiment also, as with the first embodiment, the influence of defocus due to floating of the original characteristically appears as multiplexing of image ascribed to the CIS optical system. FIG. 8 is a graph showing illuminance distributions in an area in the image indicated by D in FIG. 7, which is an area including the edge portion of the original sheet with respect to the main scanning direction. FIG. 8 shows illuminance distributions with respect to the main scanning direction in cases where the floating amount of the original is 2 mm, where the floating amount of the original is 4 mm, and where the original is not floating (original surface). When the original is floating, the gradient of the illuminance in the edge portion becomes lower, and small fluctuations occur. FIG. 9 is a result of frequency analysis of these illuminance signals by fast Fourier transformation (FFT).

What differs in this embodiment from the first embodiment is that the portion selected as distinguishing portion is the edge portion located at the edge of the original sheet with respect to the main scanning direction, which is hard to be affected by the image on the original sheet, while in the first embodiment the selected portion is a high contrast portion in the read image. Therefore, this embodiment is characterized by that deterioration of frequency characteristics on the original surface ascribed to the original is small. However, the principle of the generation of a DP is the same, and the frequency band in which a DP appears is the same. Thus, DPs ascribed to a 2 mm floating and a 4 mm floating appear as signals more conspicuous than the signal distribution obtained by reading on the original surface.

In this embodiment, a threshold value is set for the FFT intensity as shown in FIG. 9. The DP is obtained by determining the frequencies before and after the peak at which the FFT intensity curve and the line of the threshold intersect and calculating the center of them by averaging.

The behavior of the DP is also similar to that in the first embodiment. Specifically, the DP becomes lower as the floating amount of the original increases. Because this correlation or relationship between the DP and the floating amount of the original does not depend on the image, the floating amount of the original can be determined from the detected DP using the relationship shown in FIG. 5 directly.

Because the floating amount of the original can be determined in a manner similar to the first embodiment, how the imaging condition and the density become with the presence of the floating amount can easily be estimated using simulation or other methods. Therefore, appropriate image processing such as contrast correction and/or density correction can be applied to the image in accordance with the floating amount of the original.

Since the edge portion of the original has particularly high contrast, it is suitable as an object of frequency analysis.

The sequential processing for determining the floating amount of the original described above may be executed while reading process by the image reading apparatus is performed. The sequential processing for determining the floating amount of the original according to the second embodiment will be described with reference to the flow chart in FIG. 10.

Figure 10:
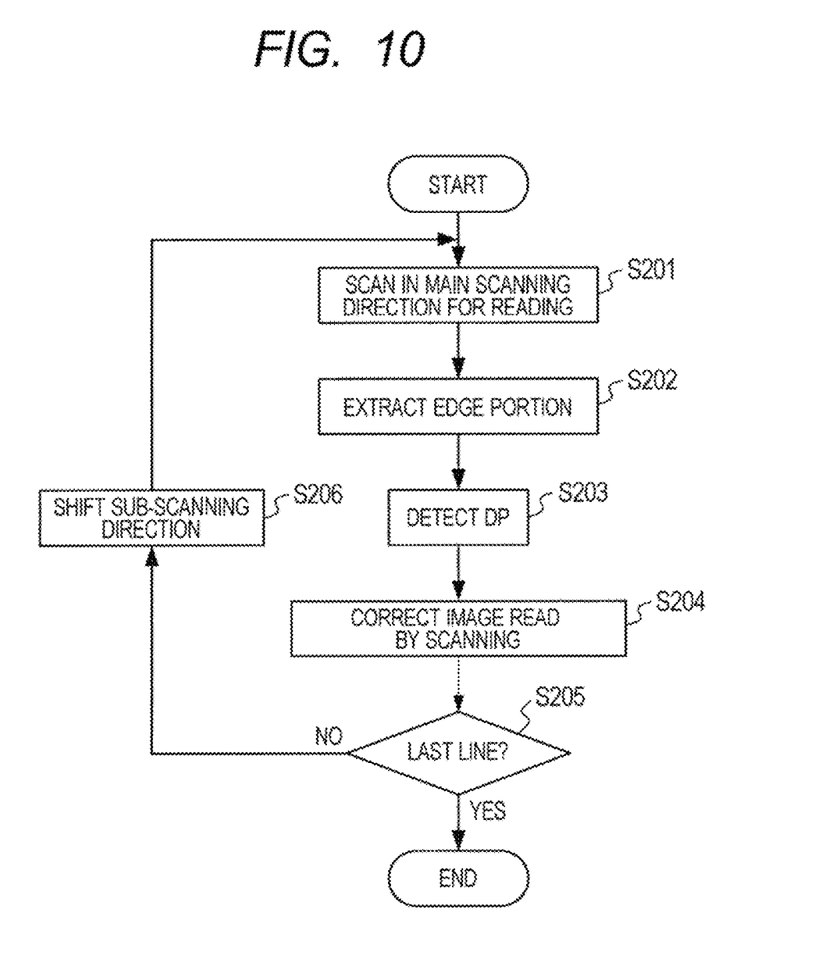
FIG. 10 is a flow chart of the operation of the image reading apparatus according to the second embodiment of the present invention.

The image reading apparatus starts to operate upon receiving a read command.

In step S201, scanning reading along the main scanning direction is performed to obtain image information with respect to the main scanning direction (line image information). The scanning reading along the main scanning direction reads image information along the direction of arrangement of the erection 1× magnification lens array 114 (main scanning direction). After the completion of scanning reading of one line along the main scanning direction, the process proceeds to step S202.

In step S202, an image edge portion (corresponding to a portion at an edge of the original) is extracted from the image information of one line (line image information) thus obtained. The image edge portion serves as a distinguishing portion to be used in a later DP detection process. The image edge portion can easily be extracted based on its characteristic feature that the image of the original terminates at it and the image from it to the end of the line image is black. This enables highly accurate detection of a DP in DP extraction using frequency analysis executed later.

Then, in step S203, a characteristic frequency (DP) is detected by performing frequency analysis of the image information of the edge portion extracted in step S202.

Then, in step S204, the image data of one line obtained by scanning reading is corrected based on the detected DP.

In step S205, a determination is made as to whether the main scanning line of which the scanning reading is performed is the last line or not. If it is not the last line, the process proceeds to step S206. If it is the last line, the process is terminated.

In step S206, the carriage on which the erection 1× magnification lens array 114 is fixedly mounted is shifted in the sub-scanning direction. Then, the process returns to step S201, and scanning reading is performed repeatedly for the next and subsequent lines up to the last line.

By the above processing, a two-dimensional image having high image quality with little influence by floating of the original can be obtained promptly after the completion of the scanning operation of the image reading apparatus.

In the above-described embodiments, there have been described exemplary methods in which each time scanning reading of one line along the main scanning direction is performed, the floating amount in that line is determined, and image correction is performed for the image data read in that line in accordance with the floating amount thus determined. However, the present invention is not limited to this method. Not after the reading of one line along the main scanning direction but after scanning reading of a predetermined number of lines along the main scanning direction, a floating amount used in image correction may be determined by performing processing, such as averaging or smoothing, of floating amounts determined for the respective main scanning lines taking into account the floating amounts determined for adjacent main scanning lines, and the floating amount thus determined may be used in image correction.

The one-dimensional photoelectric transducer may have either one row or a plurality of rows covered with color filters of different colors. The lens array may be a lens array made of a material having refractive index distribution or a lens array in which lenses having curvature are laminated.

The floating amount of the original obtained as above may be used not only in image processing but also in notifying a user of the image reading apparatus of the fact that the original is floating, as the function of the image reading apparatus. Then, the user may reset the original to eliminate floating and cause the apparatus to read the image again. Alternatively, the user may try another method, e.g. manual image processing, to obtain a sharper image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-282612, filed Dec. 26, 2011, which is hereby incorporated by reference herein in its entirety.

What is claimed is:

1. A method, executed by an image reading apparatus, of detecting a floating amount of an original from an original table, the image reading apparatus including the original table on which the original is placed, a line sensor, and a lens array configured to guide light from the original to the line sensor, the method comprising:
  obtaining, executed by the image reading apparatus, of image information of the original at least via the line sensor and the lens array;
  extracting, executed by the image reading apparatus, of a characteristic frequency by frequency analysis of the image information; and
  detecting, executed by the image reading apparatus, of the floating amount based upon the characteristic frequency.

2. The method according to claim 1,
wherein the original includes a first area and a second area different from each other in contrast, and
wherein the extracting of the characteristic frequency comprises extracting of the characteristic frequency by frequency analysis of image information of one of the first area or the second area which is higher than the other in contrast.

3. The method according to claim 1, wherein the extracting of the characteristic frequency comprises extracting of the characteristic frequency by frequency analysis of image information corresponding to an edge area of the original with respect to a direction of arrangement of the lens array.

4. The method according to claim 1, wherein, in the extracting of the characteristic frequency, the frequency analysis is performed by fast Fourier transformation.

5. A method, executed by an image reading apparatus, of image processing image information of an original obtained by the image reading apparatus, the image reading apparatus including an original table on which the original is placed, a line sensor, and a lens array configured to guide light from the original to the line sensor, the method comprising:
  extracting, executed by the image reading apparatus, of a characteristic frequency by frequency analysis of the image information;
  detecting, executed by the image reading apparatus, of a floating amount of the original from the original table based on the characteristic frequency; and
  processing, executed by the image reading apparatus, of the image information based on the floating amount.

6. The method according to claim 5, wherein, in the processing of the image information, contrast of the image information is corrected.

7. The method according to claim 5, wherein, in the processing of the image information, density of the image information is corrected.

8. An image reading apparatus comprising:
  an original table on which an original is placed;
  a line sensor; and
  a lens array configured to guide light from the original to the line sensor,
  wherein the image reading apparatus is configured to perform: a first process of acquiring image information of the original; a second process of extracting a characteristic frequency of the image information through frequency analysis; and a third process of detecting a floating amount of the original based on the characteristic frequency.

9. The image reading apparatus according to claim 8, wherein the original includes a first area and a second area different from each other in contrast, and
wherein the second process includes subjecting image information of one of the first area or the second area which is higher than the other in contrast to the frequency analysis to obtain the characteristic frequency.

10. The image reading apparatus according to claim 8, wherein the second process includes subjecting image information, which corresponds to an edge area of the original with respect to a direction of arrangement of the lens array, to the frequency analysis to obtain the characteristic frequency.

11. The image reading apparatus according to claim 8, wherein the second process includes performing the frequency analysis by fast Fourier transformation.

12. The image reading apparatus according to claim 8, wherein the image reading apparatus is configured to perform a fourth process of processing the image information based on the floating amount.

13. The image reading apparatus according to claim 12, wherein the fourth process includes correcting contrast of the image information.

14. The image reading apparatus according to claim 12, wherein in fourth process includes correcting density of the image information.

15. The image reading apparatus according to claim 8, wherein the image reading apparatus is configured to notify a user that the original is floating from the original table.

16. The image reading apparatus according to claim 15, wherein the image reading apparatus is configured to notify a user of the floating amount.

* * * * *